United States Patent
Ingle et al.

(10) Patent No.: US 11,142,604 B2
(45) Date of Patent: Oct. 12, 2021

(54) LATEX POLYMER

(71) Applicant: Hewlett-Packard Development Company, L.P., Spring, TX (US)

(72) Inventors: David Michael Ingle, San Diego, CA (US); Phillip C. Cagle, San Marcos, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 56 days.

(21) Appl. No.: 16/329,990

(22) PCT Filed: Jan. 31, 2017

(86) PCT No.: PCT/US2017/015902
§ 371 (c)(1),
(2) Date: Mar. 1, 2019

(87) PCT Pub. No.: WO2018/143959
PCT Pub. Date: Aug. 9, 2018

(65) Prior Publication Data
US 2019/0194372 A1    Jun. 27, 2019

(51) Int. Cl.
*C08F 220/54*    (2006.01)
*C09D 11/322*    (2014.01)
(Continued)

(52) U.S. Cl.
CPC .......... *C08F 220/54* (2013.01); *C08F 220/18* (2013.01); *C08F 220/56* (2013.01);
(Continued)

(58) Field of Classification Search
CPC ............. C08F 220/18; C08F 220/1806; C08F 220/54; C08F 220/56
See application file for complete search history.

(56) References Cited

U.S. PATENT DOCUMENTS 4,371,582 A * 2/1983 Sugiyama ............ B41M 5/5245
347/105
5,139,882 A * 8/1992 Elser .................. C09D 151/003
428/522
(Continued)

FOREIGN PATENT DOCUMENTS

| CN | 103517954 | 1/2014 |
|---|---|---|
| EP | 1992669 | 11/2008 |

(Continued)

OTHER PUBLICATIONS

International Search Report and Written Opinion for International Application No. PCT/US2017/015902 dated Oct. 12, 2017, 8 pages.

*Primary Examiner* — Ling Siu Choi
*Assistant Examiner* — David L Miller
(74) *Attorney, Agent, or Firm* — Dierker & Kavanaugh PC

(57) ABSTRACT

Herein is described a latex polymer derived from a composition comprising a cycloaliphatic monomer and an aromatic monomer, wherein the cycloaliphatic monomer comprises a cycloaliphatic (meth)acrylate monomer or a cycloaliphatic (meth)acrylamide monomer and the aromatic monomer comprises an aromatic (meth)acrylate monomer or an aromatic (meth)acrylamide monomer. Also described is an inkjet ink composition comprising the latex polymer.

10 Claims, 1 Drawing Sheet

(51) Int. Cl.
  *C09D 11/107* (2014.01)
  *C09D 11/324* (2014.01)
  *C09D 133/08* (2006.01)
  *C08F 220/18* (2006.01)
  *C08F 220/56* (2006.01)
  *B41M 5/00* (2006.01)
  *C08F 2/22* (2006.01)

(52) U.S. Cl.
  CPC .......... *C09D 11/107* (2013.01); *C09D 11/322* (2013.01); *C09D 11/324* (2013.01); *C09D 133/08* (2013.01); *B41M 5/0011* (2013.01); *C08F 2/22* (2013.01); *C08F 220/1806* (2020.02); *C08F 2800/20* (2013.01)

(56) References Cited

U.S. PATENT DOCUMENTS

| | | | |
|---|---|---|---|
| 5,225,456 A * | 7/1993 | Langerbeins | C08J 7/0427 523/201 |
| 6,184,268 B1 | 2/2001 | Nichols et al. | |
| 7,696,262 B2 | 4/2010 | Cagle et al. | |
| 7,744,205 B2 | 6/2010 | Sarkisian et al. | |
| 8,113,643 B2 | 2/2012 | Sarkisian et al. | |
| 8,114,923 B2 | 2/2012 | Sarkisian et al. | |
| 8,267,505 B2 | 9/2012 | Jolly et al. | |
| 8,440,742 B2 | 5/2013 | Cagle et al. | |
| 8,783,842 B2 | 7/2014 | Ingle et al. | |
| 9,187,667 B2 | 11/2015 | Doumaux et al. | |
| 2003/0069329 A1 | 4/2003 | Kubota et al. | |
| 2005/0007432 A1* | 1/2005 | Kanaya | C09D 11/30 347/100 |
| 2006/0235110 A1 | 10/2006 | Vincent et al. | |
| 2007/0084380 A1 | 4/2007 | Cagle et al. | |
| 2010/0053288 A1 | 3/2010 | Tomoyuki et al. | |
| 2011/0039027 A1* | 2/2011 | Tamura | C09D 11/40 427/256 |
| 2012/0092427 A1 | 4/2012 | Ganapathiappan et al. | |
| 2014/0128541 A1* | 5/2014 | Farrugia | C08F 214/02 524/745 |
| 2014/0204155 A1 | 7/2014 | Vanbesien et al. | |
| 2015/0225586 A1 | 8/2015 | Ingle et al. | |
| 2015/0252205 A1 | 9/2015 | Sarkisian et al. | |
| 2015/0275007 A1 | 10/2015 | Cagle et al. | |

FOREIGN PATENT DOCUMENTS

| | | | |
|---|---|---|---|
| JP | 2003238888 | 8/2003 | |
| JP | 2011012253 | 1/2011 | |
| JP | 2013189532 | 9/2013 | |
| KR | 20100020172 | 2/2010 | |
| WO | WO-1999023182 | 5/1999 | |
| WO | WO-2009011692 | 1/2009 | |
| WO | WO-2016105502 A1 * | 6/2016 | ............ C08F 265/06 |

* cited by examiner

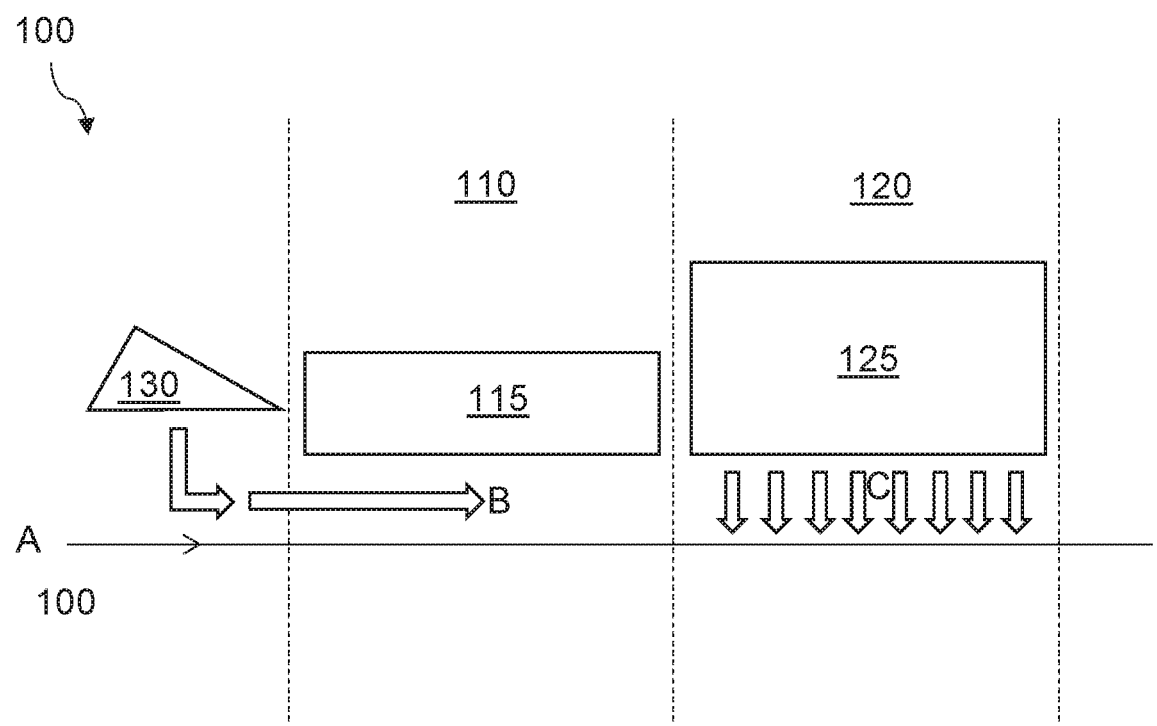

LATEX POLYMER

BACKGROUND

Inkjet printing with aqueous inks is increasingly being used to print on non-porous flexible and rigid media for signage and other printing applications. It is recognized that inkjet printing of aqueous inks on nonporous media is substantially different than inkjet applications for traditional porous paper-based media. On porous papers, ink drying occurs primarily by ink penetration into the media pore structure, and control of image quality aspects is a strong function of the rate of ink penetration into the media. Thus, optimization of the penetration rate is used for attributes such as optical density and color-to-color bleed. On nonporous media, there is no penetration of the ink into the media, i.e. the colorant remains on the surface of the media, and image quality defects resulting from wetting and ink migration across the nonporous surface are more difficult to control, especially at high printing speeds.

Durability of aqueous inks on nonporous substrates poses a challenge. Inks need to wet and adhere to a broad range of substrates, have good abrasion and scratch resistance, resist attack by water, cleaning fluids, and solvents, and have good outdoor weatherability. There have been great improvements in the durability of aqueous ink-jet inks through incorporation of certain ink-jet compatible latex polymer dispersions made by emulsion polymerization. When printed as part of an ink-jet ink, a latex component of the ink can form a film on a media surface, entrapping and protecting the colorant within the hydrophobic print film.

BRIEF DESCRIPTION OF THE FIGURES

FIG. 1 is a schematic diagram of a printing system for use in an example of a method of printing.

DETAILED DESCRIPTION

Before the latex polymers, ink compositions, methods and related aspects of the disclosure are disclosed and described, it is to be understood that this disclosure is not restricted to the particular process features and materials disclosed herein because such process features and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "co-polymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, the term "about" is used to provide flexibility to a numerical range endpoint by providing that a given value may be a little above or a little below the endpoint. The degree of flexibility of this term can be dictated by the particular variable.

As used herein, "latex," "latex polymer," or "latex particles" refer to the polymeric masses synthesized from individual monomers, which can be dispersed in a liquid vehicle forming a latex dispersion. The term "latex" generally refers to liquid and polymeric particles that are dispersed within the liquid. However, when a latex (i.e. a latex dispersion including latex polymer particles) is formulated within an ink, the liquid becomes part of the liquid vehicle of the ink, and thus, latex polymer can be described based on the latex particle or latex polymer solids that remain dispersed in the liquid vehicle.

The term "monomer emulsion" refers to an organic monomer or monomer mix that is emulsified in an aqueous or water phase. Once the organic monomer or monomer mix is polymerized, a latex polymer dispersion is formed.

The term "latex polymer dispersion" or "latex dispersion" includes both latex particulates as well as the aqueous medium in which the latex particulates are dispersed. More specifically, a latex dispersion is a liquid suspension comprising a liquid (such as water and/or other liquids) and polymeric particulates from 20 nm to 500 nm (preferably from 100 nm to 300 nm) in size (average particle size), and having a weight average molecular weight from about 10,000 Mw to 2,000,000 Mw (preferably from about 100,000 Mw to 300,000 Mw). Such polymeric particulates can comprise a plurality of monomers that are typically randomly polymerized, and can also be crosslinked. When crosslinked, the molecular weight can be even higher than that cited above. The average particle size (e.g. volume or intensity weighted average particle size) may be determined by dynamic light scattering.

The term "non-porous" when referring to a substrate, such as a media substrate, includes surfaces that can have relatively poor water permeability and absorption. Vinyl, polypropylene, polyethylene and other plastic sheets or films, metals, coated offset media, glass, certain woods, and other similar substrates are considered to be non-porous. The term "non-porous media" refers to print media which has a Bristow Test of less than 2 ml/m$^2$ at a contact time of less than 0.5 s. The Bristow Test is known in the art and is summarized below. A test specimen of defined dimensions is affixed to the smooth rim of a wheel free to rotate at a defined constant speed in contact with a stationary test fluid applicator pressing against the test specimen with a defined pressure. The test fluid applicator consists of a test solution storage compartment affixed above a 1 by 15-mm test fluid delivery slot, the slot being positioned so that the long dimension is perpendicular to the direction of rotation of the rim of the wheel, and parallel to the wheel axis. A defined quantity of test fluid is placed through the fluid reservoir, onto the fluid delivery slot. With the wheel with the test specimen affixed rotating at constant speed, the test solution applicator is brought into contact with the rotating test specimen and held in place under defined pressure. The test fluid is transferred from the test solution applicator onto the test specimen in a band whose width, controlled by the applicator slot width is approximately 15 mm, and whose length is function of the absorptive characteristics of the test fluid interaction with the test specimen under the defined test conditions. The amount of liquid absorbed per unit area of test specimen is calculated from the volume of test fluid originally placed in the applicator, and the average width and length of the band created on the test specimen by the transferred test fluid. The time available for the liquid absorption is calculated from the volume of test fluid originally placed in the applicator and applicator geometry.

As used herein, "ink vehicle" refers to the liquid fluid in which a latex polymer and a pigment are placed to form an ink. Ink vehicles may include a mixture of a variety of different agents, including, for example, surfactants, solvents, co-solvents, buffers, biocides, viscosity modifiers, sequestering agents, stabilizing agents, humectants and water.

The term "decap" is a measure of how long a printing nozzle may remain inactive before plugging and how many inkjet architecture firings are required to re-establish proper drop ejection.

The term "(meth)acrylate" is well understood in the art to refer to both acrylates and methacrylates. For example, "cyclohexyl (meth)acrylate" refers to cyclohexyl acrylate and/or cyclohexyl methacrylate. Likewise, the term "cycloaliphatic (meth)acrylate monomer" denotes a cycloaliphatic acrylate monomer and/or a cycloaliphatic methacrylate monomer; and the term "aromatic(meth)acrylate monomer" denotes an aromatic acrylate monomer and/or an aromatic methacrylate monomer.

The term "(meth)acrylamide" is well understood in the art to refer to both acrylamides and methacrylamides. For example, the term "cycloaliphatic (meth)acrylamide monomer" denotes a cycloaliphatic acrylamide monomer and/or a cycloaliphatic methacrylamide monomer; and the term "aromatic (meth)acrylamide monomer" denotes an aromatic acrylamide monomer and/or an aromatic methacrylamide monomer.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

Unless otherwise stated, any feature described herein can be combined with any aspect or any other feature described herein.

While non-porous media for outdoor signage are typically PVC-based, which is relatively easy to adhere to with conventional latex inkjet inks, other non-porous media, e.g. rigid media, comprise a much greater breadth of media surface types, and many of these surfaces present difficult challenges for aqueous latex inks, such as adhesion to hydrophobic materials like polypropylene. Adhesion to low energy surfaces (e.g., polyethylene, polypropylene) has been found to be particularly difficult. This problem has been encountered in many industries as the need to use inexpensive recyclable parts has increased.

Previous solutions to inkjet printing on a wide variety of non-porous substrates have employed primers which are applied to the non-porous media before printing. This requires significant operator intervention to ensure each substrate to be printed is completely primed with an even primer coating. Any defects in the application of the primer result in print quality issues. Additionally such primers often contain environmentally harsh solvents (e.g. cyclohexanone).

The present inventors have found difficulties with printing some existing latex inkjet inks to some non-porous media, particularly non-porous media with low energy surfaces, such as polypropylene and polyethylene.

The present inventors have found that in order to print on a wide range of non-porous media in-printer ink drying and curing of inkjet compositions should take place at a media temperature of about 70° C. or less, for example about 65° C. or less to avoid media deformation which may occur at higher temperatures. Therefore, the present inventors have sought to provide latex polymers and inkjet ink compositions comprising such latex polymers which adhere to a wide range of substrates, particularly non-porous substrates, e.g. rigid and non-porous substrates, without the need for primer coating prior to printing of the inject inks and which also provide good decap performance and provide excellent pigment binding resulting in excellent pigment retention upon environmental exposure.

In an aspect there is provided latex polymer derived from a composition comprising a cycloaliphatic monomer and an aromatic monomer, wherein the cycloaliphatic monomer comprises a cycloaliphatic (meth)acrylate monomer or a cycloaliphatic (meth)acrylamide monomer and the aromatic monomer comprises an aromatic (meth)acrylate monomer or an aromatic (meth)acrylamide monomer.

In another aspect there is provided an inkjet ink composition comprising a latex polymer and an ink vehicle, wherein the latex polymer is derived from a composition comprising a cycloaliphatic monomer and an aromatic monomer, wherein the cycloaliphatic monomer comprises a cycloaliphatic (meth)acrylate monomer or a cycloaliphatic (meth)acrylamide monomer and the aromatic monomer comprises an aromatic (meth)acrylate monomer or an aromatic (meth)acrylamide monomer.

In another aspect there is provided a method of inkjet printing comprising: providing a non-porous print substrate; and inkjet printing an inkjet ink composition to the print substrate to form an ink layer on the print substrate, wherein the inkjet ink composition comprises a latex polymer and an ink vehicle, wherein the latex polymer is derived from a composition comprising a cycloaliphatic monomer and an aromatic monomer, wherein the cycloaliphatic monomer comprises a cycloaliphatic (meth)acrylate monomer or a cycloaliphatic (meth)acrylamide monomer and the aromatic monomer comprises an aromatic (meth)acrylate monomer or an aromatic (meth)acrylamide monomer.

Latex Polymer

Described herein is a latex polymer derived from a composition comprising a cycloaliphatic monomer and an aromatic monomer, wherein the cycloaliphatic monomer comprises a cycloaliphatic (meth)acrylate monomer or a cycloaliphatic (meth)acrylamide monomer and the aromatic monomer comprises an aromatic (meth)acrylate monomer or an aromatic (meth)acrylamide monomer. For example; the latex polymer may comprise a copolymer of a cycloaliphatic monomer and an aromatic monomer, wherein the cycloaliphatic monomer comprises one or more monomers comprising a cycloaliphatic (meth)acrylate monomer or a cycloaliphatic (meth)acrylamide monomer, and the aromatic monomer comprises one or more monomers comprising an aromatic (meth)acrylate monomer or an aromatic (meth)acrylamide monomer. For example, the latex polymer may comprise a copolymer comprising cycloaliphatic monomer units (e.g. cycloaliphatic (meth)acrylate and/or cycloaliphatic (meth)acrylamide units) and aromatic monomer units (e.g. aromatic (meth)acrylate and/or aromatic (meth)acrylamide units).

The terms 'cycloaliphatic' and 'aromatic' are well understood by the skilled person.

In some examples, the cycloaliphatic monomer comprises a cycloaliphatic (meth)acrylate monomer or a cycloaliphatic (meth)acrylamide monomer. In some examples, the cycloaliphatic monomer comprises a cycloaliphatic (meth)acrylate monomer. A cycloaliphatic (meth)acrylate monomer is a monomer comprising a cycloaliphatic moiety bonded to, either directly or indirectly, a (meth)acrylate moiety (e.g. by a carbon chain; for example a substituted or unsubstituted carbon chain, for example a saturated or unsaturated carbon chain, such as a $C_{1-12}$ carbon chain, for example a $C_{1-10}$ carbon chain, a $C_{1-6}$ carbon chain, or a $C_{1-4}$ carbon chain, wherein one or more of the carbon atoms may be replaced by a heteroatom such as oxygen, nitrogen or sulfur, for example oxygen). In some examples, the cycloaliphatic monomer comprises a cycloaliphatic (meth)acrylamide monomer. A cycloaliphatic (meth)acrylamide monomer is a monomer comprising a cycloaliphatic moiety bonded to, either directly or indirectly, a (meth)acrylamide moiety (e.g. by a carbon chain, for example a saturated or unsaturated carbon chain, such as a $C_{1-12}$ carbon chain, for example a substituted or unsubstituted carbon chain, for example a $C_{1-10}$ carbon chain, a $C_{1-6}$ carbon chain, or a $C_{1-4}$ carbon chain, wherein one or more of the carbon atoms may be replaced by a heteroatom such as oxygen, nitrogen or sulfur, for example oxygen).

In some examples, the cycloaliphatic moiety comprises a 5-12 membered aliphatic ring, for example a carbon ring having 5-12 carbon atoms (e.g. a $C_5$-$C_{12}$ ring), or a 5-12 membered heteroaliphatic ring. In some examples, the cycloaliphatic moiety comprises a $C_5$-$C_{12}$ ring, a $C_5$-$C_{12}$ ring may be a single ring (such as cyclopentyl, cyclohexyl or cycloheptyl groups) or a bicyclic ring (such as decalin). In some examples, the cycloaliphatic moiety comprises a 5-10 membered aliphatic ring, for example a 6-10 membered aliphatic ring.

In some examples, the cycloaliphatic moiety comprises a carbon ring having 5-10 carbon atoms (e.g. a $C_5$-$C_{10}$ ring). In some examples, the cycloaliphatic moiety comprises a carbon ring having 6-10 carbon atoms (e.g. a $C_6$-$C_{10}$ ring).

In some examples, the cycloaliphatic moiety comprises a substituent, such as an alkyl, heteroalkyl, alkoxy, hydroxyl, cycloaliphatic or aromatic substituent. In some examples, the cycloaliphatic moiety comprises a substituent, such as an alkyl group (for example a $C_{1-12}$ alkyl group, for example $C_{1-10}$ alkyl group, $C_{1-6}$ alkyl group, $C_{1-4}$ alkyl group, or a methyl group), an aryl group (e.g. a $C_{5-12}$ aryl group, for example $C_{5-10}$ aryl group), a heteroalkyl group (e.g. a $C_{1-12}$ heteroalkyl (such as ether containing group), for example $C_{1-10}$ heteroalkyl, $C_{1-8}$ heteroalkyl, $C_{1-4}$ heteroalkyl (e.g. $C_{1-4}$ ether)). In some examples, the cycloaliphatic moiety is an optionally substituted cycloaliphatic moiety, for example optionally substituted with a $C_{1-12}$ alkyl group.

In some examples, the aromatic monomer comprises an aromatic (meth)acrylate monomer or an aromatic (meth)acrylamide monomer. In some examples, the aromatic monomer comprises an aromatic (meth)acrylate monomer. An aromatic (meth)acrylate monomer is a monomer comprising an aromatic moiety bonded to, either directly or indirectly, a (meth)acrylate moiety (e.g. by a carbon chain, for example a substituted or unsubstituted carbon chain, for example a saturated or unsaturated carbon chain, such as a $C_{1-12}$ carbon chain, for example a $C_{1-10}$ carbon chain, a $C_{1-6}$ carbon chain, or a $C_{1-4}$ carbon chain, wherein one or more of the carbon atoms may be replaced by a heteroatom such as oxygen, nitrogen or sulfur, for example oxygen). In some examples, the aromatic monomer comprises an aromatic (meth)acrylamide monomer. An aromatic (meth)acrylamide monomer is a monomer comprising an aromatic moiety bonded to, either directly or indirectly, a (meth)acrylamide moiety (e.g. by a carbon chain; for example a substituted or unsubstituted carbon chain, for example a saturated or unsaturated carbon chain, such as a $C_{1-12}$ carbon chain, for example a $C_{1-10}$ carbon chain, a $C_{1-6}$ carbon chain, or a $C_{1-4}$ carbon chain, wherein one or more of the carbon atoms may be replaced by a heteroatom such as oxygen, nitrogen or sulfur, for example oxygen).

In some examples, the aromatic moiety comprises a 5-12 membered aromatic ring, for example an aromatic carbon ring having 6-12 carbon atoms (e.g. a $C_6$-$C_{12}$ ring), or a 5-12 membered heteroaromatic ring. In some examples, the aromatic moiety comprises a $C_5$-$C_{12}$ aromatic ring, a $C_5$-$C_{12}$ aromatic ring may be a single aromatic ring (e.g. benzyl or phenyl), or a bicyclic aromatic ring (e.g. naphthyl). In some examples, the aromatic moiety comprises a 5-10 membered aromatic ring, for example a 6-10 membered aromatic ring.

In some examples, the aromatic moiety comprises an aromatic carbon ring having 6-10 carbon atoms (e.g. a $C_6$-$C_{10}$ aromatic ring).

In some examples, the aromatic moiety comprises a substituent, such as an alkyl, heteroalkyl (including an ether containing group), alkoxy, hydroxyl, cycloaliphatic or aromatic substituent. In some examples, the aromatic moiety comprises a substituent. In some examples, the aromatic moiety may be substituted by an alkyl group, (for example a $C_{1-12}$ alkyl group, for example $C_{1-10}$ alkyl group, $C_{1-6}$ alkyl group, $C_{1-4}$ alkyl group, or a methyl group), an aryl group (e.g. a $C_{5-12}$ aryl group, for example $C_{5-10}$ aryl group), a heteroalkyl group (e.g. a $C_{1-12}$ heteroalkyl (such as ether containing group), for example $C_{1-10}$ heteroalkyl, $C_{1-6}$ heteroalkyl, $C_{1-4}$ heteroalkyl (e.g. $C_{1-4}$ ether)). In some examples, the aromatic moiety is optionally substituted, for example optionally substituted with a $C_{1-12}$ alkyl group.

In some example, the cycloaliphatic monomer is a cycloaliphatic monomer having the formula (I)

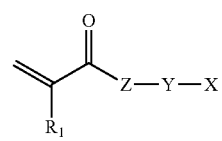

formula (I)

wherein, $R_1$ is H or methyl;

Z is O or $NR_2$, where $R_2$ is H, alkyl or X';

Y is a bond or a carbon chain, where one or more of the carbon atoms of the carbon chain may be replaced with a heteroatom such as oxygen, sulfur or nitrogen;

X and X' are independently cycloaliphatic moieties.

In some examples $R_2$ is alkyl, for example $C_{1-12}$, $C_{1-10}$, $C_{1-6}$, or $C_{1-4}$ alkyl (e.g. methyl or ethyl). In some examples $R_2$ is an optionally substituted alkyl group. In some examples $R_2$ is H, an optionally substituted alkyl group or X'. In some examples, $R_2$ is H or X'. In some examples, $R_2$ is H.

In some examples, Y is a bond or a saturated or unsaturated carbon chain. In some examples Y is a bond or a $C_{1-12}$, for example $C_{1-10}$, $C_{1-6}$, or $C_{1-4}$ carbon chain. In some examples, one or more of the carbon atoms of the carbon chain represented by Y is replaced with a heteroatom selected from oxygen, sulfur and nitrogen. In some examples, Y is a bond.

In some examples, X is a 5-12 membered ring, for example a carbon ring having 5-12 carbon atoms (e.g. a $C_5$-$C_{12}$ ring), or a 5-12 membered heteroaliphatic ring. In some examples, X is a $C_5$-$C_{12}$ single ring (such as cyclopentyl, cyclohexyl or cycloheptyl groups) or a bicyclic ring (such as decalin).

In some examples, X is a carbon ring having 5-10 carbon atoms (e.g. a $C_5$-$C_{10}$ ring). In some examples, X is a carbon ring having 6-10 carbon atoms (e.g. a $C_6$-$C_{10}$ ring).

In some examples, X is substituted, for example with an alkyl, alkoxy, hydroxyl, heteroalkyl, cycloaliphatic or aromatic substituent. In some examples, X is substituted with an alkyl group (for example a $C_{1-12}$ alkyl group, for example $C_{1-10}$ alkyl group, $C_{1-6}$ alkyl group, $C_{1-4}$ alkyl group, or a methyl group), an aryl group (e.g. a $C_{5-12}$ aryl group, for example $C_{5-10}$ aryl group), a heteroalkyl group (e.g. a $C_{1-12}$ heteroalkyl (such as ether containing group), for example $C_{1-10}$ heteroalkyl, $C_{1-6}$ heteroalkyl, $C_{1-4}$ heteroalkyl (e.g. $C_{1-4}$ ether)). In some examples, X is optionally substituted, for example optionally substituted with a $C_{1-12}$ alkyl group.

In some examples, X' is a carbon ring having 5-12 carbon atoms (e.g. a $C_5$-$C_{12}$ ring), or a 5-12 membered heteroaliphatic ring. In some examples, X' is a $C_5$-$C_{12}$ single ring (such as cyclopentyl, cyclohexyl or cycloheptyl groups) or a bicyclic ring (e.g a C6 or C10 fused ring, such as decalin).

In some examples, X' is a carbon ring having 5-10 carbon atoms (e.g. a $C_5$-$C_{10}$ ring). In some examples, X' is a carbon ring having 6-10 carbon atoms (e.g. a $C_6$-$C_{10}$ ring).

In some examples, X' is substituted, for example with an alkyl, alkoxy, hydroxyl, heteroalkyl, cycloaliphatic or aromatic substituent. In some examples, X' is substituted with an alkyl group (for example a $C_{1-12}$ alkyl group, for example $C_{1-10}$ alkyl group, $C_{1-6}$ alkyl group, $C_{1-4}$ alkyl group, or a methyl group), an aryl group (e.g. a $C_{5-12}$ aryl group, for example $C_{5-10}$ aryl group), a heteroalkyl group (e.g. a $C_{1-12}$ heteroalkyl (such as ether containing group), for example $C_{1-10}$ heteroalkyl, $C_{1-6}$ heteroalkyl, $C_{1-4}$ heteroalkyl (e.g. $C_{1-4}$ ether)). In some examples, X' is optionally substituted, for example optionally substituted with a $C_{1-12}$ alkyl group.

In some examples, for example when Z is $NR_2$ and $R_2$ is X', X and X' may be the same.

Examples of cycloaliphatic monomers include: cyclohexyl acrylate, cyclohexyl methacrylate, methylcyclohexyl acrylate, methylcyclohexyl methacrylate, trimethylcyclohexyl acrylate, trimethylcyclohexyl methacrylate, and other cycloaliphatic methacrylate and acrylate monomers including ester derivatives of decalinol, hydrogenated bisphenol A and F. In some examples, the latex polymer comprises at least about 50 wt % cycloaliphatic monomers by total weight solids of the latex polymer, for example at least about 55 wt %, or at least about 60 wt % cycloaliphatic monomers by total weight solids of the latex polymer.

In some examples, the latex polymer comprises up to about 95 wt % cycloaliphatic monomers by total weight solids of the latex polymer, for example up to about 90 wt % cycloaliphatic monomers by total weight solids of the latex polymer.

In some examples, the latex polymer comprises from about 50 wt % to about 90 wt %, for example from about 60 wt % to about 90 wt % cycloaliphatic monomers by total weight solids of the latex polymer.

In some example, the aromatic monomer is an aromatic monomer having the formula (II)

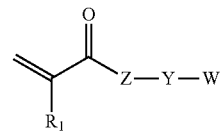

formula (II)

wherein, $R_1$ is H or methyl;

Z is O or $NR_2$, where $R_2$ is H, alkyl or W;

Y is a bond or a carbon chain, where one or more of the carbon atoms of the carbon chain may be replaced with a heteroatom such as oxygen, sulfur or nitrogen;

W and W' are independently aromatic moieties.

In some examples $R_2$ is alkyl, for example $C_{1-12}$, $C_{1-10}$, $C_{1-8}$, or $C_{1-4}$ alkyl (e.g. methyl or ethyl). In some examples $R_2$ is an optionally substituted alkyl group. In some examples $R_2$ is H, an optionally substituted alkyl group or W'. In some examples, $R_2$ is H or W'. In some examples, $R_2$ is H.

In some examples, Y is a bond or a saturated or unsaturated carbon chain. In some examples Y is a bond or a $C_{1-12}$, for example $C_{1-10}$, $C_{1-10}$, $C_{1-8}$, or $C_{1-4}$ carbon chain. In some examples, one or more of the carbon atoms of the carbon chain represented by Y is replaced with a heteroatom selected from oxygen, sulfur and nitrogen. In some examples, Y is a bond.

In some examples, W is a 5-12 membered aromatic ring, for example a carbon ring having 6-12 carbon atoms (e.g. a $C_6$-$C_{12}$ aromatic ring), or a 5-12 membered heteroaromatic ring. In some examples W comprises a $C_5$-$C_{12}$ aromatic ring, a $C_5$-$C_{12}$ aromatic ring may be a single aromatic ring (e.g. benzyl or phenyl) or a bicyclic aromatic ring (e.g a fused C6 or C10 aromatic ring, e.g. naphthyl). In some examples, W is a 5-10 membered aromatic ring, for example a 6-10 membered aromatic ring.

In some examples, W is an aromatic carbon ring having 6-10 carbon atoms (e.g. a $C_5$-$C_{10}$ aromatic ring).

In some examples, W is substituted, for example W may be substituted with an alkyl group (for example a $C_{1-12}$ alkyl group, for example $C_{1-10}$ alkyl group, $C_{1-6}$ alkyl group, $C_{1-4}$ alkyl group, or a methyl group), an aryl group (e.g. a $C_{5-12}$ aryl group, for example $C_{5-10}$ aryl group), a heteroalkyl group (e.g. a $C_{1-12}$ heteroalkyl (such as ether containing group), for example $C_{1-10}$ heteroalkyl, $C_{1-6}$ heteroalkyl, $C_{1-4}$ ether). In some examples, W is optionally substituted, for example optionally substituted with a $C_{1-12}$ alkyl group.

In some examples, W' is a 5-12 membered aromatic ring, for example a carbon ring having 6-12 carbon atoms (e.g. a $C_6$-$C_{12}$ aromatic ring), or a 5-12 membered heteroaromatic ring. In some examples W' comprises a $C_6$-$C_{12}$ aromatic ring, a $C_6$-$C_{12}$ aromatic ring may be a single aromatic ring (e.g. benzyl or phenyl) or a bicyclic aromatic ring (e.g. a fused C6 or C10 aromatic ring, e.g. naphthyl). In some examples, W' is a 5-10 membered aromatic ring, for example a 6-10 membered aromatic ring.

In some examples, W' is an aromatic carbon ring having 6-10 carbon atoms (e.g. a $C_6$-$C_{10}$ aromatic ring).

In some examples, W is substituted, for example, W may be substituted with an alkyl group (for example a $C_{1-12}$ alkyl group, for example $C_{1-10}$ alkyl group, $C_{1-6}$ alkyl group, $C_{1-4}$ alkyl group, or a methyl group), an aryl group (e.g. a $C_{5-12}$ aryl group, for example $C_{5-10}$ aryl group), a heteroalkyl group (e.g. a $C_{1-12}$ heteroalkyl (such as ether containing group), for example $C_{1-10}$ heteroalkyl, $C_{1-6}$ heteroalkyl, $C_{1-4}$ ether). In some examples, W is optionally substituted, for example optionally substituted with a $C_{1-12}$ alkyl group.

In some examples, for example when Z is $NR_2$ and $R_2$ is W', W and W' may be the same.

Examples of aromatic monomers include: 2-phenoxyethyl methacrylate, 2-phenoxyethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, N-benzyl methacrylate, N-benzyl acrylate, N,N-diphenyl methacrylamide, N,N-diphenyl acrylamide, naphthyl methacrylate, naphthyl acrylate, phenyl methacrylate and phenyl acrylate.

In some examples, the latex polymer comprises at least about 1 wt % aromatic monomers by total weight solids of the latex polymer, for example at least about 2 wt %, or at least about 5 wt % aromatic monomers by total weight solids of the latex polymer.

In some examples, the latex polymer comprises up to about 35 wt % aromatic monomers by total weight solids of the latex polymer, for example up to about 30 wt %, up to about 25 wt %, or up to about 20 wt % aromatic monomers by total weight solids of the latex polymer.

In some examples, the latex polymer comprises from about 1 wt % to about 35 wt % aromatic monomers by total weight solids of the latex polymer, for example from about 2 wt % to about 30 wt %, or about 5 wt % to about 25 wt % aromatic monomers by total weight solids of the latex polymer.

In some examples, the latex polymer has a glass transition temperature of about 20° C. or greater, for example about 30° C. or greater, about 40° C. or greater, about 45° C. or greater, or about 50° C. or greater.

In some examples, the latex polymer has a glass transition temperature of up to about 100° C., for example up to about 95° C., up to about 90° C., up to about 80° C., or up to about 70° C.

In some examples, the latex polymer has a glass transition temperature in the range of about 20° C. to about 100° C., for example about 30° C. to about 90° C., about 50° C. to about 90° C., or about 55° C. to about 70° C.

The glass transition temperature (Tg) of the latex polymer may be estimated using the Fox equation (T. G. Fox, Bull. Am. Physics Soc., Volume 1, Issue No. 3, page 123 (1956)) using the Tg of the homopolymers of each of the monomers forming the copolymer of the latex polymer. The maximum Tg of each of the homopolymers of each of the monomers making up to copolymer of the latex polymer may be taken from literature values (for example as listed in "Polymer Handbook", edited by J. Brandrup, E. H. Immergut, and E. A. Grulke, Wiley Publishers, $4^{th}$ edition). The glass transition temperature of the latex polymer may also be determined using DSC (differential scanning calorimetry) according to ASTM D3418.

In some examples, the composition from which the latex polymer is derived further comprises an alkyl meth(acrylate). In some examples, the composition from which the latex polymer is derived comprises an alkyl methacrylate monomer. In some examples, the composition from which the latex polymer is derived comprises an alkyl acrylate monomer. In some examples, the composition from which the latex polymer is derived comprises an alkyl acrylate monomer and an alkyl methacrylate monomer. In some examples, the alkyl (meth)acrylate may be a $C_{1-8}$ alkyl (meth)acrylate.

In some examples, the latex polymer comprises an alkyl meth(acrylate) component. In some examples, the latex polymer further comprises an alkyl methacrylate component. In some examples, the latex polymer further comprises an alkyl acrylate component. In some examples, the latex polymer further comprises an alkyl acrylate component and an alkyl methacrylate component.

In some examples, the latex polymer comprises from about 0 wt % to about 10 wt %, for example from about 0.1 wt % to about 10 wt % of an alkyl meth(acrylate), for example methyl methacrylate.

In some examples, the latex polymer comprises a copolymer formed from an alkyl meth(acrylate) monomer, a cycloaliphatic monomer and an aromatic monomer. In some examples, the latex polymer comprises a copolymer formed from an alkyl meth(acrylate) monomer, (meth)acrylic acid, a cycloaliphatic monomer and an aromatic monomer. In some examples, the latex polymer comprises a copolymer formed from a (meth)acrylic acid, a cycloaliphatic monomer and an aromatic monomer.

In some examples, the composition from which the latex polymer is derived further comprises an acid monomer, for example (meth)acrylic acid monomers or carboxylic acid monomers. In some examples, the composition from which the latex polymer is derived further comprises (meth)acrylic acid. For example, the composition may comprise (meth)acrylic acid in an amount of 0 wt % to about 15 wt %, about 0.1 wt % to about 15 wt %, for example, about 0.25 wt % to about 10 wt %, or about 0.25 wt % to about 6 wt %. In some examples, the composition from which the latex polymer is derived further comprises methacrylic acid. For example, the composition may comprise methacrylic acid in an amount of 0 wt % to about 15 wt %, about 0.1 wt % to about 15 wt %, for example, about 0.25 wt % to about 10 wt %, or about 0.25 wt % to about 6 wt %.

In some examples, the composition from which the latex polymer is derived further comprises an alkyl meth(acrylate) monomer and/or (meth)acrylic acid. In some examples, the composition from which the latex polymer is derived further comprises an alkyl meth(acrylate) monomer and (meth) acrylic acid.

In some examples, the latex polymer substantially lacks a styrene component. For example, the latex polymer may comprise less than about 5 wt % styrene by total weight solids of the latex polymer, for example less than about 4 wt %, less than about 3 wt %, less than about 2 wt %, less than about 1 wt %, less than about 0.5 wt %, or less than about 0.1 wt % styrene by total weight solids of the latex polymer. In some examples, the latex polymer lacks a styrene component.

In some examples, the latex polymer may be prepared by copolymerizing the monomer components with a copolymerizable surfactant (for example surfactants from the Hitenol® AR series or Hitenol® BC series, e.g. Hitenol® BC-10, BC-30, KH-05 or KH-10) to form a latex dispersion.

In some examples, the latex polymer is prepared by combining the monomers as an aqueous emulsion with an initiator. In some examples any suitable polymer initiator may be used. In some examples, the initiator may be selected from a persulfate, such as a metal persulfate or an ammonium persulfate. In some examples, the initiator may be selected from a sodium persulfate, ammonium persulfate or potassium persulfate.

A latex dispersion comprises latex polymer particles dispersed in water.

Inkjet Ink Composition

Described herein is an inkjet ink composition comprising a latex polymer and an ink vehicle, wherein the latex polymer is derived from a composition comprising a cycloaliphatic monomer and an aromatic monomer, wherein the cycloaliphatic monomer comprises a cycloaliphatic (meth)acrylate monomer or a cycloaliphatic (meth)acrylamide monomer and the aromatic monomer comprises an aromatic (meth)acrylate monomer or an aromatic (meth)acrylamide monomer. In some examples, the latex ink composition comprise a latex polymer, a pigment and an ink vehicle.

The latex polymer of the inkjet ink composition may be as described above.

In some examples, the inkjet ink composition comprises up to about 35 wt % pigment and latex polymer solids by total weight of the composition, for example up to about 30 wt %, about 25 wt % or up to about 20 wt % pigment and latex polymer solids by total weight of the composition.

In some examples, the inkjet ink composition comprises from about 0.5 wt % to about 35 wt % pigment and latex polymer solids by total weight of the composition, for example from about 1 wt % to about 30 wt %, from about 1 wt % to about 25 wt %, or from about 2 wt % to about 20 wt % pigment and latex polymer solids by total weight of the composition. The present inventors have found that compositions having a total amount of pigment and latex polymer solids within these ranges may be suitable for inkjet printing, for example for thermal inkjet printing.

In some examples, the inkjet ink composition comprises at least about 3 wt % latex polymer by total weight of the composition, for example at least about 5 wt % latex polymer by total weight of the composition. In some examples, the inkjet ink composition comprises up to about 25 wt % latex polymer by total weight of the composition, for example up to about 20 wt %, or up to about 15 wt % latex polymer by total weight of the composition. In some examples, the inkjet ink composition comprises from about 3 wt % to about 25 wt %, for example about 5 wt % to about 25 wt % latex polymer by total weight of the composition.

In some examples, the inkjet ink composition comprises at least about 0.1 wt % pigment by total weight of the composition, for example, at least about 0.3 wt % pigment by total weight of the composition. In some examples, the inkjet ink composition comprises up to about 30 wt % pigment by total weight of the composition, for example, up to about 20 wt % pigment by total weight of the composition, or up to about 15 wt % pigment by total weight of the composition. In some examples, the inkjet ink composition comprises from about 0.1 wt % to about 30 wt %, for example 0.3 wt % to about 30 wt % pigment by total weight of the composition.

In some examples, the inkjet ink composition comprises an amount of pigment and an amount of latex polymer, such that the ratio of the amount of pigment to amount of latex by weight is in the range of about 0.1:15 to 10:5.

In some examples, the inkjet ink composition substantially lacks a styrene component. For example, the inkjet ink composition may comprise less than about 5 wt % styrene by total weight solids of the latex polymer, for example less than about 4 wt %, less than about 3 wt %, less than about 2 wt %, less than about 1 wt %, less than about 0.5 wt %, or less than about 0.1 wt % styrene by total weight solids of the latex polymer.

Pigment

In some examples, the inkjet ink composition comprises a pigment. For example, the inkjet ink composition may comprise a latex polymer, a pigment, and an ink vehicle.

In some examples, the inkjet ink composition is unpigmented or substantially lacks a pigment. For example, the inkjet ink composition may comprise less than 0.5 wt % of a pigment, for example less than 0.1 wt % of a pigment or less than 0.05 wt % of a pigment by total weight of the composition. In some examples, the inkjet ink composition is unpigmented and lacks a pigment, for example the inkjet ink composition may be a colourless composition.

The term "pigment" can include particulate dispersible colorants that can be suspended or dispersed in a liquid vehicle in accordance with embodiments of the present invention. The pigment itself can be a self-dispersed pigment or a non-self-dispersed pigment.

The pigment may include black pigments, white pigments, cyan pigments, magenta pigments, yellow pigments, or the like. Suitable inorganic pigments include, for example, carbon black. However, other inorganic pigments may be suitable such as titanium oxide, cobalt blue (CoO—$Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens, perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, and the like. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138, Pigment Yellow 155, Pigment Yellow 83, and Pigment Yellow 213. Such pigments are commercially available in either powder or press cake form from a number of sources including, BASF™ Corporation, Engelhard™ Corporation and Sun Chemical™ Corporation.

Examples of black pigments that can be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot™ Corporation, Columbian Chemicals Company, Degussa AG™, and E.I. DuPont™ de Nemours and Company. Suitable carbon black pigments include, without limitation, Cabot pigments such as MONARCH™ 1400, MONARCH™ 1300, MONARCH™ 1100, MONARCH™ 1000, MONARCH™ 900. MONARCH™ 880, MONARCH™ 800, MONARCH™ 700, CAB-O-JET™ 200, CAB-O-JET™ 300, REGAL™, BLACK PEARLS, ELFTEX™, MOGUL™, and VULCAN™ pigments; Columbian pigments such as RAVEN™ 7000, RAVEN™ 5750, RAVEN™ 5250, RAVEN™ 5000, and RAVEN™ 3500; Degussa pigments such as Color Black FW200, RAVEN™ FW2, RAVEN™ FW2V, RAVEN™ FW 1, RAVEN™ FW 18, RAVEN™ S160, RAVEN™ FW S170, Special Black™ 6, Special Black™ 5, Special Black™ 4A, Special Black™ 4, PRINTEX™ U, PRINTEX™ 140U, PRINTEX™ V, and PRINTEX™140V.

Similarly, a wide variety of colored pigments can be used with the inkjet ink composition, therefore the following listing is not intended to be limiting. For example, colored pigments can be blue, brown, cyan, green, white, violet, magenta, red, orange, yellow, as well as mixtures thereof. The following color dispersions are available from Cabot™ Corp. CABO-JET™ 250C, CABO-JET™ 260M, and CABO-JET™ 270Y The following color pigments are available from BASF™ Corp.: PALIOGEN™ Orange, PALIOGEN™ Orange 3040, PALIOGEN™ Blue L 6470, PALIOGEN™ Violet 5100, PALIOGEN™ Violet 5890, PALIOGEN™ Yellow 1520, PALIOGEN™ Yellow 1560, PALIOGEN™ Red 3871K, PALIOGEN™ Red 3340, HELIOGEN™ Blue L 6901F, HELIOGEN™ Blue NBD 7010, HELIOGEN™ Blue K 7090, HELIOGEN™ Blue L 7101F, HELIOGEN™ Blue L6900, L7020, HELIOGEN™ Blue D6840, HELIOGEN™ Blue D7080, HELIOGEN™ Green L8730, HELIOGEN™ Green K 8683, and HELIOGEN™ Green L 9140. The following pigments are available from Ciba-Geigy Corp.: CHROMOPHTAL™ Yellow 3G, CHROMOPHTAL™ Yellow GR, CHROMOPHTAL™ Yellow 8G, IGRAZIN™ Yellow 5GT, IGRALITE™ Rubine 4BL, IGRALITE™ Blue BCA, MONASTRAL™ Magenta, MONASTRAL™ Scarlet, MONASTRAL™ Violet R, MONASTRAL™ Red B, and MONASTRAL™ Violet Maroon B. The following pigments are available from Heubach Group™: DALAMAR™ Yellow YT-858-D and HEUCOPHTHAL™ Blue G XBT-583D. The following pigments are available from Hoechst Specialty Chemicalsm: Permanent Yellow GR. Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM™ Yellow HR, NOVOPERM™ Yellow FGL, Hansa Brilliant Yellow 10GX, Permanent Yellow G3R-01, HOSTAPERM™ Yellow H4G, HOSTAPERM™ Yellow H3G, HOSTAPERM™ Orange GR, HOSTAPERM™ Scarlet GO, HOSTAPERM™ Pink E, Permanent Rubine F6B, and the HOSTAFINE™ series. The following pigments are available from Mobay Corp.: QUINDO™ Magenta, INDOFAST™ Brilliant Scarlet, QUINDO™ Red R6700, QUINDO™ Red R6713, and INDOFAST™ Violet. The following pigments are available from Sun Chemical Corp.: L74-1357 Yellow, L75-1331 Yellow, and L75-2577 Yellow. Other examples of pigments can include Normandy Magenta RD-2400, Permanent Violet VT2645, Argyle Green XP-111-S, Brilliant Green Toner GR 0991, Sudan Blue OS, PV Fast Blue B2GO1, Sudan III, Sudan II, Sudan IV, Sudan Orange G, Sudan Orange 220, Ortho Orange OR 2673, Lithol Fast Yellow 0991 K, Paliotol Yellow 1840, Lumogen Yellow D0790, Suco-Gelb L1250, Suco-Yellow D1355, Fanal Pink D4830, Cinquasia Magenta, Lithol Scarlet D3700, Toluidine Red, Scarlet for Thermoplast NSD PS PA, E. D. Toluidine Red, Lithol Rubine Toner, Lithol Scarlet 4440, Bon Red C, Royal Brilliant Red RD-8192, Oracet Pink RF, Lithol Fast Scarlet L4300, and white TIPURE R-101. These pigments are available from commercial sources such as Hoechst Celanese Corporation™, Paul Uhlich, BASF, American Hoechst™, Ciba-Geigy™, Aldrich™, DuPont™, Ugine Kuhlman of Canada™, Dominion Color Company™, Magruder™, and Matheson™. Examples of other suitable colored pigments are described in the Colour Index, 3rd edition (The Society of Dyers and Colourists, 1982).

Ink Vehicle

The ink vehicle of the inkjet ink composition comprises water. The water, or a portion of the water, of the ink vehicle may be introduced to the ink vehicle as a latex polymer emulsion is combined with the first and second solvents of the ink vehicle. In some examples, additional water may be added to the inkjet ink composition.

The inkjet ink composition comprises water. In some examples, the inkjet ink composition comprises at least about 20 wt %, for example at least about 30 wt %, at least about 40 wt %, or at least about 50 wt % by total weight of the composition. In some examples, the inkjet ink composition comprises up to about 90 wt % water, for example up to about 85 wt %, up to about 80 wt %, or up to about 75 wt % by total weight of the composition. In some examples, the inkjet ink composition comprises water in an amount from about 20 wt % to about 85 wt % by total weight of the inkjet ink composition, for example about 30 wt % to about 80 wt %, about 40 wt % to about 80 wt %, or from about 50% to about 75% water.

In some examples, the ink vehicle comprises water and a co-solvent (for example a blend of co-solvents). In some examples, the inkjet ink composition comprises the co-solvent in an amount of at least about 1 wt %, for example at least about 5 wt %, or at least about 10 wt % by total weight of the composition. In some examples, the inkjet ink composition comprises the co-solvent in an amount up to about 50 wt %, for example up to about 40 wt %, or up to about 35 wt % by total weight of the composition. In some examples the inkjet ink composition comprises a co-solvent in an amount of about 1 to about 50 wt % by total weight of the composition, for example from about 5 to about 40 wt % of the composition, or about 10 to about 35 wt % of the total weight of the composition.

In some examples, the ink vehicle comprises a co-solvent having a boiling point ranging from 160° C. to 285° C. In some examples, the ink vehicle comprises a co-solvent having a boiling point ranging from 170° C. to 250° C., for example from 170° C. to 220° C., or 170° C. to 215° C. In some examples, the ink vehicle comprises a co-solvent having a boiling point of about 215° C. or less.

In some examples, the co-solvent may be selected form organic co-solvents including aliphatic alcohols, aromatic alcohols, diols, glycol ethers, polyglycol ethers, caprolactams, formamides, acetamides, and long chain alcohols. In some examples, the co-solvent may be selected form primary aliphatic alcohols, secondary aliphatic alcohols, 1,2-alcohols, 1,3-alcohols, 1,4-alcohols, 1,5-alcohols, ethylene glycol alkyl ethers, propylene glycol alkyl ethers, higher homologs ($C_6$-$C_{12}$) of polyethylene glycol alkyl ethers, pyrrolidinones, N-alkyl caprolactams, unsubstituted caprolactams, both substituted and unsubstituted formamides, both substituted and unsubstituted acetamides, and combinations thereof.

In some examples, the co-solvent comprises a first solvent having a boiling point of about 215° C. or less and a second solvent having a boiling point of at least about 220° C.

In some examples, the ink vehicle of the inkjet ink composition comprises a first solvent having a boiling point of about 212° C. or less, for example about 210° C. or less, for example about 205° C. or less. In some examples, the first solvent has a boiling point of at least about 170° C., for example at least about 175° C., at least about 180° C., or at least about 185° C. In some examples, the first solvent has a boiling point in the range of about 170° C. to about 215° C. In some examples, the first solvent has a boiling point in the range of about 180° C. to about 215° C., for example about 185° C. to about 215° C., or about 185° C. to about 210° C.

In some examples, the first solvent is selected from an aliphatic alcohol, for example a primary aliphatic alcohol, a secondary aliphatic alcohol or a tertiary aliphatic alcohol. The aliphatic alcohol may be a diol. In some examples, the first solvent is an aliphatic alcohol containing 10 carbons or less, for example 8 carbons or less or 6 carbons or less. In some examples, the first solvent is an aliphatic alcohol being a diol containing 10 carbons or less, for example 8 carbons or less or 6 carbons or less.

In some examples, the first solvent is selected from the group comprising 1,2-propanediol, 1,2-butanediol, ethylene glycol, 2-methyl-2,4-pentanediol, 1,3-butanediol, 2-methyl-1,3-propanediol and 1,3-propanediol. In some examples the first solvent is selected from the group comprising 1,2-propanediol, 1,2-butanediol, ethylene glycol, 2-methyl-2,4-pentanediol, and 1,3-butanediol. In some examples the first solvent is selected from the group consisting of 1,2-propanediol, 1,2-butanediol, ethylene glycol, 2-methyl-2,4-pentanediol, 1,3-butanediol, 2-methyl-1,3-propanediol and 1,3-propanediol. In some examples the first solvent is selected from the group consisting of 1,2-propanediol, 1,2-butanediol, ethylene glycol, 2-methyl-2,4-pentanediol, and 1,3-butanediol. In some examples the first solvent is 1,2-butanediol.

In some examples, the inkjet ink composition comprises at least about 1 wt % of the first solvent by total weight of the composition, for example, at least about 5 wt %, at least about 10 wt %, or at least about 15 wt % by total weight of the composition.

In some examples, the inkjet ink composition comprises up to about 40 wt % of the first solvent by total weight of the composition, for example up to about 30 wt %, or up to about 20 wt % by total weight of the composition.

In some examples, the inkjet ink composition comprises the first solvent in an amount of from about 1 wt % to about 40 wt % by total weight of the composition, for example from about 5 wt % to about 40 wt %, about 10 wt % to about 30 wt %, or from about 15 wt % to about 20 wt % by total weight of the composition.

In some examples, the ink vehicle of the inkjet ink composition comprises a second solvent having a boiling point of at least about 220° C., for example at least about 225° C. In some examples, the second solvent has a boiling point up to about 285° C., for example up to about 280° C. In some examples, the second solvent has a boiling point in the range of about 220° C. to about 285° C., for example about 225° C. to about 285° C.

In some examples the second solvent is selected from alcohols (including aliphatic alcohols and aromatic alcohols), esters, glycol ethers, di- and trialkylene glycols, amides, lactams and sulfones. In some examples the solvent is selected from aliphatic alcohols (including primary, secondary and tertiary aliphatic alcohols, including diols), aromatic alcohols, esters, glycol alkyl ethers (such as alkylene glycol alkyl ethers, including di-, tri- and tetra-alkylene glycol alkyl ethers), glycol aryl ethers (such as alkylene glycol aryl ethers, including di- and tri-alkylene glycol aryl ethers), di- and tri-alkylene glycols, lactams (such as 2-pyrrolidinone) and sulfones (such as sulfolane).

In some examples, the second solvent is selected from aliphatic alcohols containing 20 carbons or less (for example aliphatic alcohols containing 10 carbons or less), esters containing 20 carbons or less (for example esters containing 12 carbons or less), glycol alkyl ethers, such as alkylene glycol alkyl ethers, containing 20 carbons or less (for example esters containing 12 carbons or less, or 10 carbons or less), glycol aryl ethers, such as alkylene glycol aryl ethers, containing 20 carbons or less (for example esters containing 12 carbons or less, or 10 carbons or less) such as glycol phenyl ethers (e.g. alkylene glycol phenyl ethers) containing 20 carbons or less, lactams and cyclic sulfones.

In some examples the second solvent is selected from the group comprising ethylene glycol 2-ethylhexyl ether, dipropylene glycol n-butyl ether, diethylene glycol n-butyl ether, propylene glycol phenyl ether, 2-pyrrolidinone, tripropylene glycol methyl ether (such as Dowanol™ TPM), 2,2,4-trimethyl-1,3-pentanediol monoisobutyrate, triethyl citrate, tripropylene glycol n-propyl ether, tripropylene glycol n-butyl ether (such as Dowanol™ TPnB), tetraethylene glycol dimethyl ether, and dipropylene glycol phenyl ether. In some examples, the second solvent is selected from the group comprising 2-pyrrolidinone, tripropylene glycol methyl ether and tripropylene glycol n-butyl ether.

In some examples, the inkjet ink composition comprises at least about 0.1 wt % of the second solvent by total weight of the composition, for example at least about 0.5 wt %, at least about 1 wt %, at least about 1.5 wt %, or about 2 wt % by total weight of the composition.

In some examples, the inkjet ink composition comprises up to about 8 wt % of the second solvent by total weight of the composition, for example up to about 5 wt %, up to about 3 wt %, or about 2 wt % by total weight of the composition.

In some examples, the inkjet ink composition comprises the second solvent in an amount of from 0 wt % to about 8 wt % by total weight of the composition, for example about 0.1 wt % to about 8 wt % by total weight of the composition, from about 0.5 wt % to about 8 wt %, from about 0.5 wt % to about 5 wt %, or from about 0.5 wt % to about 4 wt % by total weight of the composition.

Other Additives

The ink vehicle may also comprise a variety of additional components, suitable for inkjet ink compositions, selected from surfactants (for example suitable surfactants may be selected form alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amides, dimethicone copolyols, fluoroalkyl polyethylene oxides, substituted amine oxides, and the like, surfactants when present may be present in an amount from 0.01 wt % to 10 wt %), buffers, biocides (such as Nuosept™ (Nudex® Inc.), Ucarcide™ (Union carbide Corp™.). Vancide™ (R. T. Vanderbilt® Co.). Proxel™ (Lonza™) and combinations thereof), viscosity modifiers, sequestering agents (such as EDTA (ethylene diamine tetraacetic acid)), stabilizing agents, wetting agents, and humectants. In some examples, these other additives may be present in a total amount of from 0 wt % to 20 wt %.

Method of Inkjet Printing

Described herein is a method of inkjet printing comprising:

providing a non-porous print substrate; and inkjet printing an inkjet ink composition to the print substrate to form an ink layer on the print substrate, wherein the inkjet ink composition comprises a latex polymer and an ink vehicle, wherein the latex polymer is derived from a composition comprising a cycloaliphatic monomer and an aromatic monomer, wherein the cycloaliphatic monomer comprises a cycloaliphatic (meth)acrylate monomer or a cycloaliphatic (meth)acrylamide monomer and the aromatic monomer comprises an aromatic (meth)acrylate monomer or an aromatic (meth)acrylamide monomer.

In some examples, the method of printing comprises curing the latex polymer, for example curing the latex polymer on the print substrate (e.g. non-porous print substrate). Curing of the latex polymer forms a film of latex on the surface of the print substrate. Curing the latex polymer to form a film of latex on the print substrate improves the durability of an image printed using the inkjet ink composition.

In some examples, the ink vehicle comprises water and a co-solvent. In order for the latex polymer to be cured, firstly water should be evaporated from the ink layer, then the co-solvent (for example, first solvent and second solvent (where present)) should be at least partially evaporated from the ink layer such that particles of latex polymer come into close contact. Once the particles of the latex polymer come into close contact (due to the at least partial evaporation of water and co-solvent) the particles of the latex polymer may coalesce by the intermingling of polymer chains between adjacent latex polymer particles to cure the latex polymer to from a latex polymer film. In order for the latex polymer to be cured the temperature must be above the minimum film formation temperature (MFFT) of the latex polymer. Pigment particles, where present, remain in the ink layer and are embedded within the latex polymer film on curing of the latex polymer.

Water is evaporated from the printed inkjet ink composition before the co-solvent (e.g. first and/or second solvent) are removed from the printed inkjet ink composition as water has a higher volatility (e.g. lower boiling point) than the co-solvent.

In some examples, the co-solvent comprises a first solvent and a second solvent. In such examples, the first solvent is evaporated, or at least partially evaporated, before the second solvent, again due to the higher volatility of the first solvent compared to the second solvent. The second solvent remains in the ink layer after the water has been evaporated and the first solvent at least partially evaporated.

The present inventors have found that the presence of a co-solvent having a boiling point of less than about 215° C. (e.g. a first solvent) in the inkjet ink composition allows for fast drying of the inkjet ink composition to enable high throughput through a printing system. The present inventors have found that the presence of the second solvent in the inkjet ink composition which remain in the ink layer after evaporation of the water and at least partial evaporation of the first solvent ensure that the MFFT of the latex polymer remains lowered during the curing of the latex polymer.

In some examples, curing the latex polymer comprises evaporating water from the ink layer. In some examples, curing the latex polymer comprises evaporating water and at least a portion of the co-solvent from the ink layer. Evaporation of water and at least a portion of the co-solvent allows latex polymer particles within the ink layer to coalesce into a film ("cure"). Evaporation may be facilitated in a printing system by providing heat and/or airflow. Heating may be either conductive, radiative, or convective. Airflow may comprise parallel or impinging airflow. In some examples, heating the ink layer to evaporate water, for example water and at least a portion of co-solvent comprises heating the ink layer such that the temperature of the print substrate is maintained below a temperature at which deformation (e.g. warping) of the print substrate occurs. For example, heating the ink layer such that the print substrate reaches a temperature of less than about 70° C., for example about 65° C. or less.

In some examples, curing the latex polymer comprises evaporating substantially all of the water from the ink layer, for example evaporating at least about 95 wt %, for example at least about 99 wt %, or at least about 99.5 wt % of the water comprised in the inkjet ink composition printed as the ink layer. In some examples, curing the latex polymer comprises evaporating all of the water from the ink layer so that no water remains in the ink layer.

In some examples, curing the latex polymer comprises evaporating at least a portion of the co-solvent comprises evaporating a major amount of the co-solvent of the inkjet ink composition printed as the ink layer from the ink layer, for example evaporating at least about 80 wt %, at least about 90 wt %, at least about 95 wt %, or at least about 99 wt % of the co-solvent comprised in the inkjet ink composition printed as the ink layer.

In some examples, curing the latex polymer comprises heating the latex polymer such that latex polymer particles coalesce to form a latex polymer film. Forming a latex polymer film occurs after evaporation of water from the ink layer and at least partial evaporation of the first solvent and the second solvent (when present). Forming a latex polymer film may comprise heating the ink layer to a temperature greater that the MFFT of the latex polymer in the ink layer. In some examples, forming a latex polymer film comprises heating the ink layer to a temperature greater that the MFFT of the latex polymer in the ink layer and a temperature less than a temperature which may cause deformation of the print substrate.

In some examples, the method of printing comprises selecting an inkjet ink composition such that the MFFT of the latex polymer is below a temperature which may cause deformation of the print substrate. FIG. 1 is a schematic diagram of a printing system 100 comprising an inkjet printer 115 in a printing zone 110 of the printing system 100 and a drier 125 positioned in a curing zone 120 of the printing system 100. A print substrate may be transported through the printing system 100 along the path shown by arrow A such that the print substrate is first fed to the printing zone 110 where an inkjet ink composition is inkjet printed onto the print substrate by the inkjet printer 115 (for example from an inkjet cartridge comprising the inkjet ink composition described above) to form an ink layer on the print substrate. The ink layer disposed on the print substrate may then be heated in the printing zone 110 (for example the air temperature in the printing zone may range between 10° C. and 90° C.) such that water may be evaporated from the ink layer. The print substrate may then be transported to the curing zone 120 where the ink layer is heated (for example, the air temperature in the printing zone may range between 10° C. and 140° C.) and air is blown onto the print substrate (as shown by arrows C) such that the co-solvent is at least partially evaporated from the ink layer and the latex polymer is heated to a temperature above the MFFT of the latex polymer in the ink layer. In some examples, the printing system 100 comprises a fan 130 for blowing air over the print substrate passing through the printing zone 110 to evaporate water from the inkjet layer.

Printed Substrate

Also described herein is a printed substrate comprising a non-porous substrate on which an inkjet printed layer is disposed, the inkjet printed layer comprising a latex polymer, wherein the latex polymer comprises cycloaliphatic monomer and an aromatic monomer, wherein the cycloaliphatic monomer comprises a cycloaliphatic (meth)acrylate monomer or a cycloaliphatic (meth)acrylamide monomer and the aromatic monomer comprises an aromatic (meth)acrylate monomer or an aromatic (meth)acrylamide monomer.

Low energy surface media include polyolefinic media (polypropylene or polyethylene). These media may be factory modified to facilitate wetting by inks (e.g. aqueous inkjet inks); generally, this modification increases the surface energy, but relative to other substrates they remain 'low'. Surface energy, for example surface energy with respect to aqueous inks, may be measured by contact angle between the substrate and water. In some examples, a low energy surface media is a media (i.e. print substrate) having a surface energy of less than about 40 dyne/cm, for example less than about 35 dyne/cm. The surface energy of a print substrate may be measured according to ASTM D2578.

While the latex polymers, inkjet ink compositions, methods and related aspects have been described with reference to certain examples, it will be appreciated that various modifications, changes, omissions, and substitutions can be made without departing from the spirit of the disclosure. It is intended, therefore, that the inkjet ink compositions, methods and related aspects be limited only by the scope of the following claims. Unless otherwise stated, the features of any dependent claim can be combined with the features of any of the other dependent claims, and any other independent claim.

EXAMPLES

The following illustrates examples of the compositions and related aspects described herein. Thus, these examples should not be considered to restrict the present disclosure, but are merely in place to teach how to make examples of compositions of the present disclosure.

Preparation of Latex Polymer

Example 1—Latex 1

A latex polymer was prepared as follows. Water (138 g) was heated to 77° C. with mechanical agitation. At 77° C., latex seed (4.4 g; 67 nm particle size) was added to the reactor. At 77° C., potassium persulfate (0.36 g) dissolved in water (4% solution) is added. To this mixture was added over 300 minutes: an aqueous emulsion comprised of water (39.4 g), copolymerizable surfactant (Hitenol® AR-10) (4.9 g), cyclohexyl methacrylate (124.6 g), cyclohexyl acrylate (18.0 g), phenoxyethyl methacrylate (25.2 g) and methacrylic acid (7.2 g); and a 4% aqueous solution (18.3 g) of potassium persulfate.

Residual monomer was reduced using high temperature 85° C. followed by (7.5 g) 5% solution of ascorbic acid and 5% solution of (15.2 g) tert-butyl hydroperoxide at 70° C. After cooling to near ambient temperature, pH was adjusted to 8 with dilute potassium hydroxide; inkjet suitable aqueous biocides were added. The resulting acrylic latex was 41% solids by total weight of latex emulsion; particle size 0.22 μm (particle size determined using Microtrac Nanotrac Wave II): viscosity (at 25° C.) less than 50 cp.

Comparative Example 2—Latex 2

Water (116 g) was heated to 77° C. with mechanical agitation. At 77° C., potassium persulfate (0.30 g) dissolved in water (4% solution) was added. At 77° C., latex seed (4.4 g; 67 nm particle size) was added to the reactor. To this mixture was added over 300 minutes an aqueous emulsion comprised of water (28.2 g), copolymerizable surfactant selected from Hitenol® BC-10, BC-30, KH-05 or KH-10 (1.5 g), methyl methacrylate (91.1 g), styrene (24.1 g), butyl acrylate (4.8 g), and methacrylic acid (0.6 g).

Residual monomer was reduced as described in Example 1. After cooling to near ambient temperature, pH is adjusted to 8 with dilute potassium hydroxide; inkjet suitable aqueous biocides are added. The resulting acrylic latex is 41% solids by total weight of latex emulsion; particle size 0.22 μm; viscosity less than 50 cp.

Comparative Example 3—Latex 3

Water (138 g) is heated to 77° C. with mechanical agitation. At 77° C., latex seed (4.4 g; 67 nm particle size) is added to the reactor. At 77° C., potassium persulfate (0.36 g) dissolved in water (4% solution) is added. To this mixture is added over 300 minutes: an aqueous emulsion comprised of water (39.4 g), copolymerizable surfactant selected from Hitenol® AR-10, BC-10, BC-30 (4.9 g), cyclohexyl methacrylate (124.6 g), cyclohexyl acrylate (18.0 g), styrene (25.2 g) and methacrylic acid (7.2 g); and a 4% aqueous solution (18.3 g) of potassium persulfate.

Residual monomer was reduced as described in Example 1. After cooling the near ambient temperature, pH is adjusted to ~8 with dilute potassium hydroxide; inkjet suitable aqueous biocides are added. The resulting acrylic latex is 41% solids by total weight of latex emulsion; particle size 0.22 μm; viscosity less than 50 cp.

A black inkjet ink composition was then produced using each of the latex polymers produced in Example 1 and Comparative Examples 2 and 3. The formulation of each of the black inkjet ink compositions produced is set out in Table 1 below.

TABLE 1

| Component | Amount in grams per 100 g of total inkjet ink composition | | |
| --- | --- | --- | --- |
| | Ink 1 | Ink 2 | Ink 3 |
| 1,2-Butanediol | 18.00 | 18.00 | 18.00 |
| Dowanol ™ TPM | 2.00 | 2.00 | 2.00 |
| Dowanol ™ TPnB | 0.70 | 0.70 | 0.70 |
| DI Water | 39.75 | 39.75 | 39.75 |

TABLE 1-continued

| | Amount in grams per 100 g of total inkjet ink composition | | |
|---|---|---|---|
| Component | Ink 1 | Ink 2 | Ink 3 |
| Wetting agents | 2.20 | 2.20 | 2.20 |
| Carbon Black Pigment Dispersion | 12.84 | 12.84 | 12.84 |
| Latex 1 | 24.40 | 0 | 0 |
| Latex 2 | 0 | 24.40 | 0 |
| Latex 3 | 0 | 0 | 24.40 |

Testing

Each of Inks 1-3 was tested by inkjet printing each of the inks using a latex inkjet printer directly (i.e. with no primer or pre-treatment applied before printing of the inks) onto non-porous and rigid substrates, a polypropylene substrate and a vinyl substrate. The inks were cured at 70° C. following printing on to the polypropylene substrate and at 110° C. following printing on to the vinyl substrate. A lower curing temperature was used following printing on the polypropylene substrate as higher temperatures were found to cause warping of the polypropylene substrate, whereas the vinyl substrate is able to withstand the higher curing temperature.

Samples of each of the printed substrates were subjected to the following three tests. The results are shown in Table 2 below.

Cross Hatch Tape Adhesion Test

The cross hatch tape adhesion test was carried out as defined in ASTM D3359-09 except that Intertape Polymer Group™ 515965 tape was used in place of Permacel™ P99 test tape. The numbers 1-5 provided in Table 2 refer to the amount of latex ink removed from each of the samples following this test according to the following scale:

Test Scale: 0=0% removed
- 1=<5% removal
- 2=5-15% removal
- 3=15-35% removal
- 4=35-65% removal
- 5=>65% removal Windex® Rub Resistance Test Windex Blue® window cleaner rub resistance was measured using a Taber® linear abraser model 5750 equipped with an acrylic crockmeter tip covered with polyester cloth. The cloth was dipped in the rubbing fluid, and the printed image was rubbed 5× with 600 g pressure. Plot damage and wiper cleanliness are graded with the following scale:

| Taber Score | Plot Damage | Wiper Appearance | Criteria for Scoring |
|---|---|---|---|
| 0 | none | clean | no damage, no color transfer, clean wiper |
| 0.5 | none | hint of color | no damage (including gloss), no color loss, faint transfer to wiper |
| 1 | gloss loss | light ink transfer | no color loss - only gloss loss, light transfer to wiper |
| 2 | significant | significant transfer | 0-20% color loss |
| 3 | severe | significant transfer | 20-50% color loss |
| 4 | severe | significant transfer | 50-80% color loss |
| 5 | severe | significant transfer | >80% color loss |

70% 2-Propanol Rub Resistance Test

70% IPA rub resistance was measured using a Taber® linear abraser model 5750 equipped with an acrylic crockmeter tip covered with polyester cloth. The cloth was dipped in the rubbing fluid, and the printed image was rubbed 5× with 600 g pressure. Plot damage and wiper cleanliness are graded with the following scale:

| Taber Score | Plot Damage | Wiper Appearance | Criteria for Scoring |
|---|---|---|---|
| 0 | none | clean | no damage, no color transfer, clean wiper |
| 0.5 | none | hint of color | no damage (including gloss), no color loss, faint transfer to wiper |
| 1 | gloss loss | light ink transfer | no color loss - only gloss loss, light transfer to wiper |
| 2 | significant | significant transfer | 0-20% color loss |
| 3 | severe | significant transfer | 20-50% color loss |
| 4 | severe | significant transfer | 50-80% color loss |
| 5 | severe | significant transfer | >80% color loss |

TABLE 2

| Test | Inkjet ink Formulation | IntePro® Fluted PP Cured at 70° C. | Avery MPI 2903 SAV Vinyl Cured at 110° C. |
|---|---|---|---|
| Cross Hatch Tape Adhesion | Ink 1 | 1 | 0 |
| | Ink 2 | 5 (Fail) | 0 |
| | Ink 3 | 5 (Fail) | 0 |
| Windex® Rub Resistance | Ink 1 | 0 | 0 |
| | Ink 2 | 0 | 0 |
| | Ink 3 | 0 | 0 |
| 70% 2-Propanol Rub Resistance | Ink 1 | 1 | 3 |
| | Ink 2 | 4 (Fail) | 0 |
| | Ink 3 | 5 (Fail) | 1 |

The results provided in Table 2 show that Ink 1 containing a latex polymer according to this invention exhibits improved adhesion and durability when printed on a range of substrates, for example when printed to low energy surfaces such as polypropylene, compared to inks comprising comparative latex polymers.

The present inventors have also found that inkjet ink compositions comprising the latex polymer described herein exhibit excellent decap performance.

While the latex polymers, inkjet ink compositions, methods and related aspects have been described with reference to certain examples, it will be appreciated that various modifications, changes, omissions, and substitutions can be made without departing from the spirit of the disclosure. It is intended, therefore, that the latex polymers, inkjet ink compositions, methods and related aspects be limited only by the scope of the following claims. Unless otherwise stated, the features of any dependent claim can be combined with the features of any of the other dependent claims, and any other independent claim.

The invention claimed is:

1. A latex polymer comprising a copolymer of a cycloaliphatic monomer, an aromatic monomer, and an alkyl (meth)acrylate monomer, wherein the cycloaliphatic monomer comprises a cycloaliphatic (meth)acrylamide monomer and the aromatic monomer comprises an aromatic (meth)acrylamide monomer, and wherein the latex polymer includes from about 60 wt % to about 90 wt % of the cycloaliphatic monomer by total weight solids of the latex polymer, from about 5 wt % to about 30 wt % of the aromatic monomer by total weight solids of the latex polymer, and from about 0.1 wt % to about 10 wt % of the alkyl (meth)acrylate by total weight solids of the latex polymer.

2. The latex polymer according to claim 1, the cycloaliphatic monomer having a formula (I):

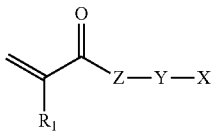

formula (I)

wherein,
R$_1$ is H or methyl;
Z is NR$_2$, where R$_2$ is H, alkyl or X';
Y is a bond or a C$_{1-12}$ carbon chain where one or more of the carbon atoms of the carbon chain may be replaced with a heteroatom selected from oxygen, sulfur and nitrogen; and
X and X' are independently cycloaliphatic moieties.

3. The latex polymer according to claim 1, the aromatic monomer having a formula (II):

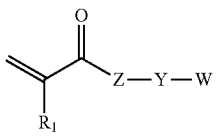

formula (II)

wherein,
R$_1$ is H or methyl;
Z is NR$_2$, where R$_2$ is H, alkyl or W';
Y is a bond or a carbon chain, where one or more of the carbon atoms of the carbon chain may be replaced with a heteroatom selected from oxygen, sulfur and nitrogen; and
W and W' are independently aromatic moieties.

4. The latex polymer according to claim 1, the latex polymer having a glass transition temperature in the range of about 40° C. to about 90 ° C.

5. An inkjet ink composition comprising the latex polymer of claim 1, and an ink vehicle.

6. The inkjet ink composition according to claim 5 comprising from about 3 wt % to about 25 wt % of the latex polymer by total weight of the inkjet ink composition.

7. The inkjet ink composition according to claim 6 comprising up to about 30 wt % pigment by total weight of the inkjet ink composition.

8. The inkjet ink composition according to claim 5, wherein the ink vehicle comprises water and a co-solvent having a boiling point in the range of about 170° C. to about 215° C.

9. A method of inkjet printing comprising:
providing a non-porous print substrate; and
inkjet printing an inkjet ink composition to the print substrate to form an ink layer on the print substrate,
wherein the inkjet ink composition comprises the latex polymer of claim 1 and an ink vehicle.

10. The method according to claim 9, comprising heating the ink layer to cure the latex polymer on the print substrate.

* * * * *